United States Patent
Huang et al.

(10) Patent No.: US 11,606,853 B2
(45) Date of Patent: Mar. 14, 2023

(54) LIGHT CONTROL METHOD AND APPARATUS BASED ON BOUNDARY IDENTIFICATION, AND STORAGE MEDIUM

(71) Applicant: Glowworm (Shenzhen) Lighting Technology Co., Ltd., Shenzhen (CN)

(72) Inventors: Mingxu Huang, Shenzhen (CN); Tianfei Zhou, Shenzhen (CN); Jiancan Chen, Shenzhen (CN); Fuzhi Zheng, Shenzhen (CN)

(73) Assignee: GLOWWORM (SHENZHEN) LIGHTING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/643,556

(22) Filed: Dec. 9, 2021

(65) Prior Publication Data

US 2022/0191996 A1    Jun. 16, 2022

(30) Foreign Application Priority Data

Dec. 11, 2020 (CN) .......................... 202011445313.X
Aug. 10, 2021 (CN) ........................... 202110914703.5

(51) Int. Cl.
*H05B 47/105* (2020.01)
*H05B 47/165* (2020.01)
(Continued)

(52) U.S. Cl.
CPC ......... *H05B 47/165* (2020.01); *H04N 19/172* (2014.11); *H04N 19/186* (2014.11);
(Continued)

(58) Field of Classification Search
CPC .... H05B 47/165; H05B 47/17; H05B 47/125; H05B 47/18; H05B 47/105; H05B 45/20;
(Continued)

(56) References Cited

U.S. PATENT DOCUMENTS

2010/0020251 A1\* 1/2010 Kadijk .................... H04N 5/58
348/836
2013/0294050 A1    11/2013 Lee et al.

FOREIGN PATENT DOCUMENTS

CN     106341929 A    1/2017
CN     210328082 U    4/2020
(Continued)

OTHER PUBLICATIONS

"International Search Report for PCT/CN2021/077129" from China National Intellectual Property Administration, dated Sep. 13, 2021.
(Continued)

*Primary Examiner* — Henry Luong
(74) *Attorney, Agent, or Firm* — M&B IP Analysts, LLC

(57) ABSTRACT

A light control method and apparatus based on boundary identification, and a storage medium are disclosed. The light control method based on boundary identification includes: acquiring video data information from a video source device; identifying an invalid edge picture region in the video data information according to a preset rule; obtaining picture color data information of pixels in a preset valid picture region in a frame picture according to the invalid edge picture region; generating a corresponding light control signal according to the picture color data information; and outputting the light control signal to a lamp bank to control an operating state of the lamp bank to match a valid picture content.

9 Claims, 8 Drawing Sheets

(51) Int. Cl.

| | |
|---|---|
| *H05B 45/20* | (2020.01) |
| *H05B 47/17* | (2020.01) |
| *H04N 19/172* | (2014.01) |
| *H04N 19/186* | (2014.01) |
| *H04N 19/44* | (2014.01) |
| *H05B 47/125* | (2020.01) |
| *H05B 47/18* | (2020.01) |
| *H05B 45/50* | (2022.01) |
| *H05B 45/14* | (2020.01) |
| *F21S 4/24* | (2016.01) |
| *F21Y 115/10* | (2016.01) |
| *F21V 33/00* | (2006.01) |

(52) U.S. Cl.
CPC ............. *H04N 19/44* (2014.11); *H05B 45/14* (2020.01); *H05B 45/20* (2020.01); *H05B 45/50* (2020.01); *H05B 47/105* (2020.01); *H05B 47/125* (2020.01); *H05B 47/17* (2020.01); *H05B 47/18* (2020.01); *F21S 4/24* (2016.01); *F21V 33/0052* (2013.01); *F21Y 2115/10* (2016.08)

(58) Field of Classification Search
CPC ...... H05B 45/50; H05B 45/14; H04N 19/172; H04N 19/186; H04N 19/44; F21S 4/24; F21Y 2115/10; F21V 33/0052
See application file for complete search history.

(56) References Cited

FOREIGN PATENT DOCUMENTS

| | | |
|---|---|---|
| CN | 111867179 A | 10/2020 |
| WO | 2017219522 A1 | 12/2017 |

OTHER PUBLICATIONS

"Written Opinion of the International Search Authority for PCT/CN2021/077129" from China National Intellectual Property Administration, dated Sep. 7, 2021.

\* cited by examiner

LIGHT CONTROL METHOD AND APPARATUS BASED ON BOUNDARY IDENTIFICATION, AND STORAGE MEDIUM

CROSS-REFERENCE TO RELATED APPLICATIONS

This application is based on and claims the benefit of priority from Chinese Patent Applications No. 2021109147035 filed on 10 Aug. 2021 and No. 202011445313X filed on 11 Dec. 2020. The contents of these applications are incorporated herein by reference in their entirety.

TECHNICAL FIELD

Embodiments of the present application relate to the technical field of light control, and more particularly, to a light control method and apparatus based on boundary identification, and a storage medium.

BACKGROUND

With the increasing of people's living standard, lighting devices have been widely used. For example, people can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

At present, the control mode for a display effect of a lamp bank with multiple lamp beads is single. If the lamp bank can be flexibly controlled to follow the change of a display picture, the effects of setting off the atmosphere and improving the viewing immersion can be achieved. However, in the related art, due to a special display ratio of the display picture or mismatching between a display picture content and a display size, a lamp bank controller cannot accurately capture the display picture, which causes the lamp bank to be unable to follow the change of a valid display picture content, losing the effects of setting off the atmosphere and improving the viewing immersion.

SUMMARY

The following is a summary of the subject detailed herein. This summary is not intended to limit the protection scope of the claims.

Embodiments of the present application provide a light control method and apparatus based on boundary identification, a controller, a module and a storage medium, which are capable of detecting and identifying a boundary of display pictures and controlling a lamp bank to follow the change of a valid display picture content.

In a first aspect, an embodiment of the present application provides a light control method based on boundary identification, applied to a light controller, wherein the light controller is in communication with a lamp bank, the lamp bank includes a plurality of lamp beads connected in sequence, and the method includes:

acquiring video data information from a video source device;

identifying a boundary of a valid picture region in the video data information according to a preset rule;

obtaining picture color data information of pixels in a preset valid picture region in a frame picture according to the boundary;

generating a corresponding light control signal according to the picture color data information; and outputting the light control signal to the lamp bank to control an operating state of the lamp bank to match a valid picture content.

In a second aspect, an embodiment of the present application provides a light control apparatus based on boundary identification, applied to a light controller, wherein the light controller is in communication with a lamp bank, the lamp bank includes a plurality of lamp beads connected in sequence, and the apparatus includes:

a first module, configured for acquiring video data information from a video source device;

a second module, configured for identifying a boundary of a valid picture region in the video data information according to a preset rule;

a third module, configured for obtaining picture color data information of pixels in a preset valid picture region in a frame picture according to the boundary;

a fourth module, configured for generating a corresponding light control signal according to the picture color data information; and a fifth module, configured for outputting the light control signal to the lamp bank to control an operating state of the lamp bank to match a valid picture content.

In a third aspect, the present application further provides a computer-readable storage medium storing a computer-executable instruction, wherein the program instruction, when executed by a processor, implements the light control method based on boundary identification according to the first aspect.

According to the light control method based on boundary identification according to the embodiment of the present application in the first aspect, the invalid edge picture region of the display picture is intelligently identified to accurately capture the valid display picture content, and the lamp bank is controlled according to the captured valid display picture content, so that the lamp bank can follow the change of the valid display picture content, thus playing a role of setting off the atmosphere and improving the viewing immersion.

It may be understood that, the beneficial effects in the second aspect and the third aspect in comparison to the prior art are the same as the beneficial effects in the first aspect in comparison to the prior art, which may be referred to the related description in the first aspect and will not be repeated here.

DETAILED DESCRIPTION

Figure 1:
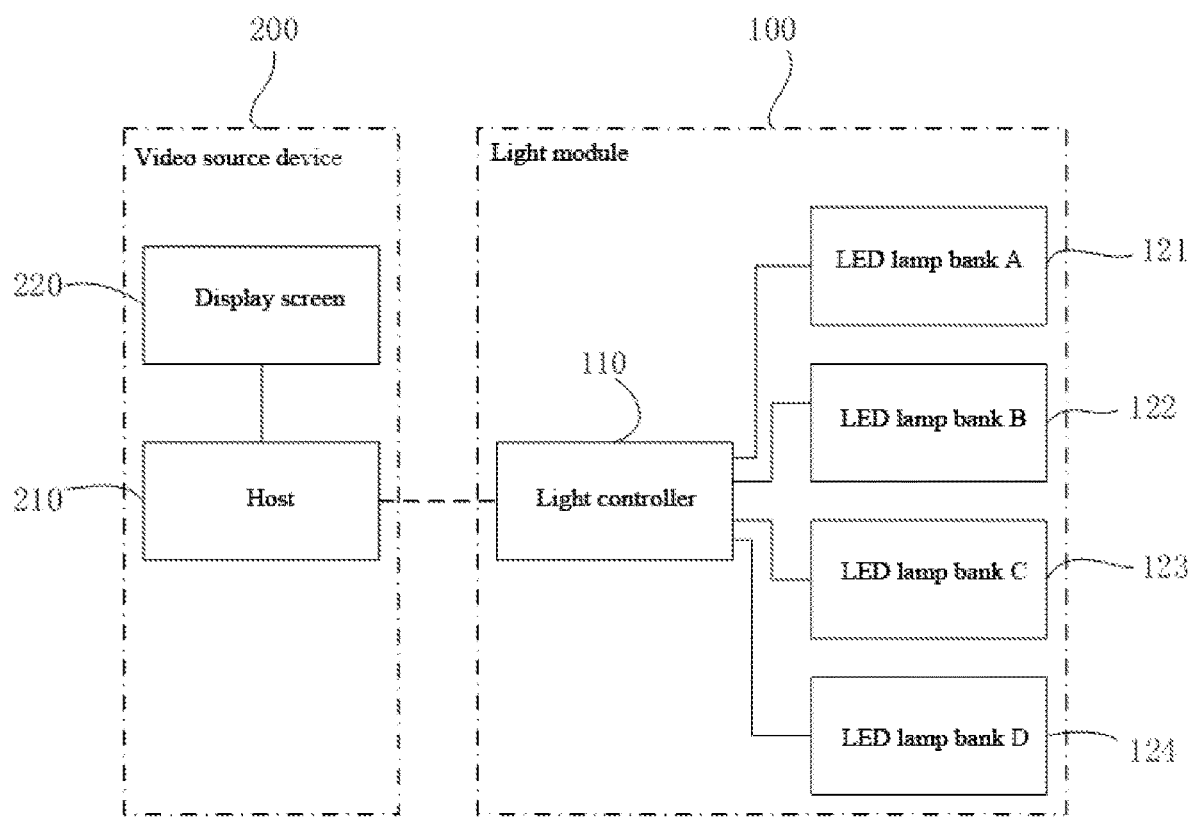
FIG. 1 is a schematic diagram of a system architecture for executing a light control method based on boundary identification according to an embodiment of the present application.

In the following description, specific details, such as specific module structure and technology, are put forward for illustration rather than limitation, so as to thoroughly understand the embodiments of the present application. However, it should be clear to those having ordinary skill in the art that the embodiments of the present application can be practiced in other embodiments without these specific details. In other cases, detailed descriptions of well-known modules, devices, circuits and methods are omitted so as not to hinder the description of the embodiments of the present application with unnecessary details.

It should be noted that, although a logical sequence is shown in the flowchart, in some cases, the steps shown or described may be executed in a sequence different from the flowchart. The terms "first", "second" and the like in the specification and claims as well as the above drawings are used to distinguish similar objects, and are not necessarily used to describe a specific sequence or a chronological order.

It should also be understood that the reference to "one embodiment" or "some embodiments" described in the specification of the embodiments of the present application means that the specific features, structures or characteristics described in connection with this embodiment are included in one or more of the embodiments of the present application. Therefore, the phrases "in one embodiment", "in some embodiments", "in some other embodiments" and "in some another embodiments" appearing in different places in this specification do not necessarily all refer to the same embodiment, but mean "one or more but not all embodiments" unless otherwise specially emphasized. The terms "comprising", "containing", "having" and their variants all mean "including but not limited to" unless otherwise specifically emphasized.

With the increasing of people's living standard, lighting devices have been widely used. For example, people can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

At present, the control mode for a display effect of a lamp bank with multiple lamp beads is single. If the lamp bank can be flexibly controlled to follow the change of a display picture, the effects of setting off the atmosphere and improving the viewing immersion can be achieved. However, in the related art, due to a special display ratio of the display picture or mismatching between a display picture content and a display size, a lamp bank controller cannot accurately capture the display picture, which causes the lamp bank to be not able to follow the change of a valid display picture content, losing the effects of setting off the atmosphere and improving the viewing immersion.

For example, in some scenarios, the display picture of the display screen is not full-screen display. If edge pixel data information of the frame picture is extracted in this case, all the extracted data may be black data, which makes the light unable to synchronize with the actual display content and affects the user experience. Specifically, if some movies have display pictures of 21:9, 16:9 or larger proportions, black edges may appear on the upper and lower sides of the display screen. If the edge pixel data information of the frame picture is extracted in this case, all the extracted data may all be black edge data, which makes the light unable to synchronize with the actual display content and affects the user experience.

Based on this, the embodiments of the present application provide a light control method and apparatus based on boundary identification, and a storage medium. Compared with the prior art, the invalid edge picture region of the display picture is intelligently identified to accurately capture the valid display picture content, and the lamp bank is controlled according to the captured valid display picture content, so that the lamp bank can follow the change of the valid display picture content, thus playing a role of setting off the atmosphere and improving the viewing immersion. For example, in some embodiments, the black edge removal process may be realized by the embodiments of the present application to accurately capture the valid display picture content, and the lamp bank is controlled according to the captured valid display picture content, so that the lamp bank can follow the change of the valid display picture content, thereby synchronizing the light with the actual display content and improving the user experience.

The embodiments of the present application are further described below with reference to the accompanying drawings.

As shown in FIG. 1, FIG. 1 is a schematic diagram of a system architecture of a light control method according to an embodiment of the present application. In the example of FIG. 1, the system architecture includes a video source device 200 and a light module 100, and the video source device 200 is in communication with the light module 100.

Figure 2:
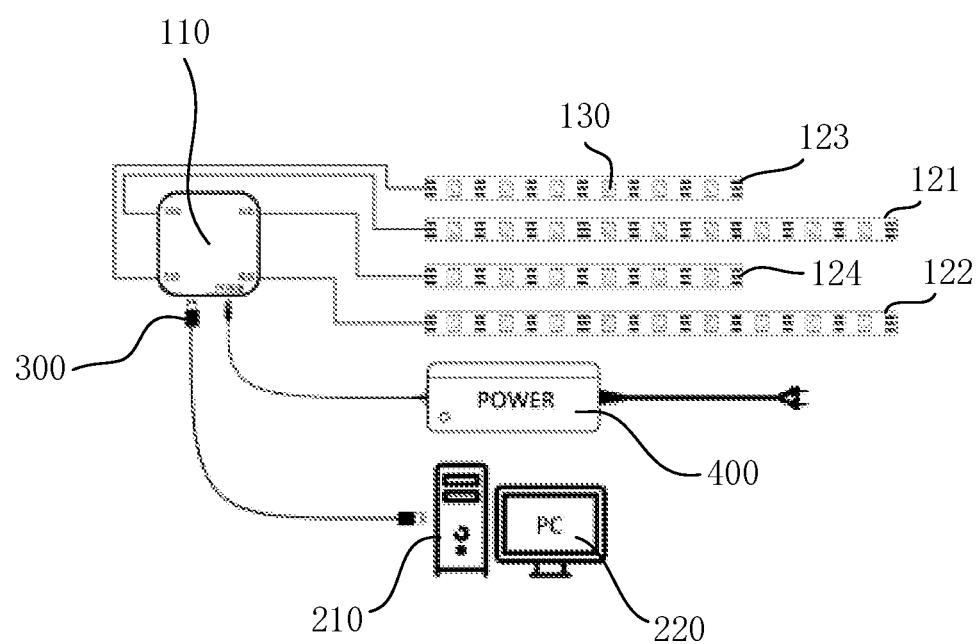
FIG. 2 is a schematic diagram of a system architecture of a light control system according to an embodiment of the present application.
Figure 3:
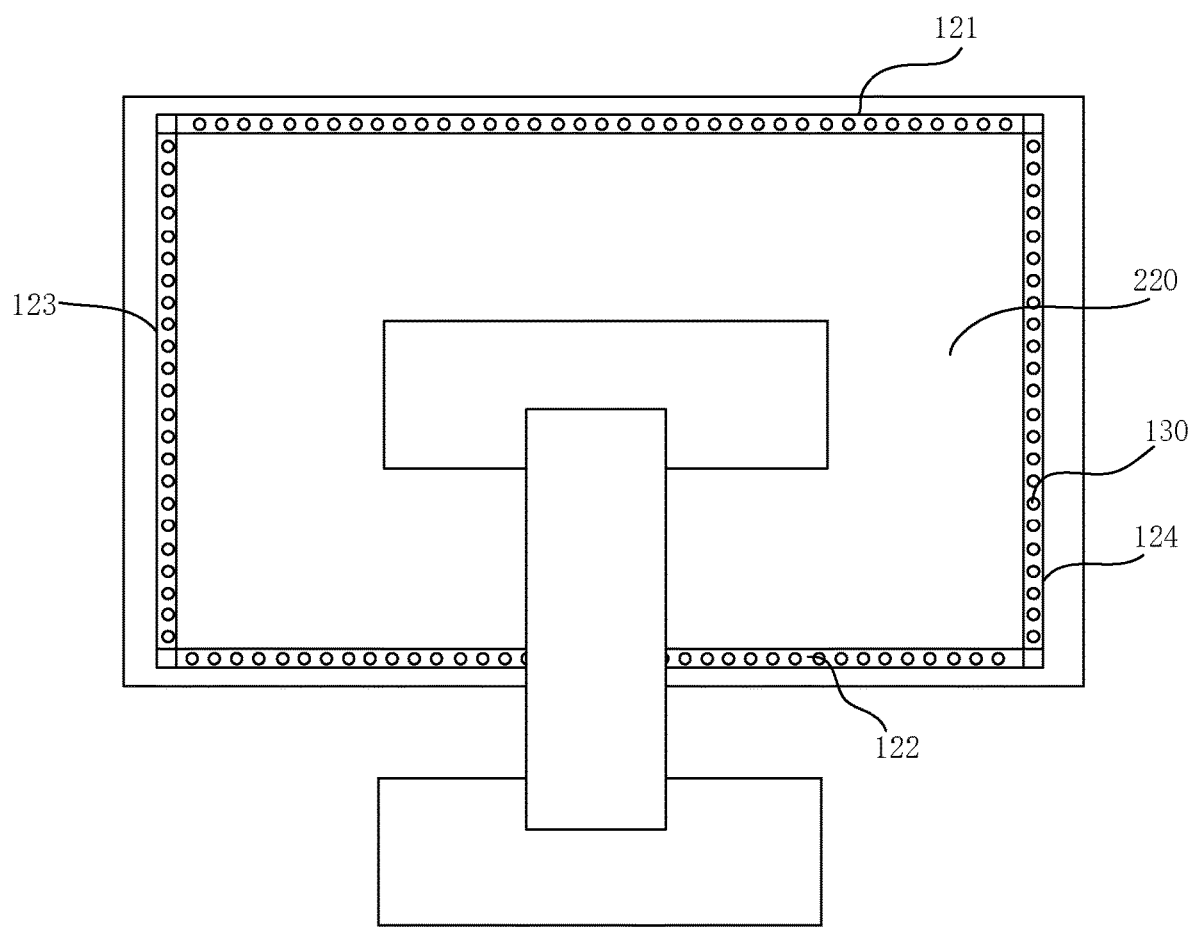
FIG. 3 is a structural schematic diagram of a back of a display screen on which a lamp bank is installed, according to an embodiment of the present application.

The video source device 200 may be a mobile terminal device or a non-mobile terminal device. The mobile terminal device may be a mobile phone, a tablet computer, a notebook computer, a handheld computer, a vehicle-mounted terminal device, a wearable device, a super mobile personal computer, a netbook, a personal digital assistant, or the like. The non-mobile terminal device may be a personal computer, a TV set, a set top box, a teller machine or a self-service machine, and the like. The embodiments of the present invention are not particularly limited. Referring to FIG. 1, FIG. 2 and FIG. 3, the following description will take the video source device 200 being a personal computer as an example. The personal computer includes a host 210 and a display screen 220 in communication with the host 210.

The light module 100 includes a light controller 110 and at least one lamp bank. The light controller 110 is in communication with the lamp bank by wired or wireless means.

As for the light controller 110, the light controller 110 is configured for being in communication with the video source device 200 and executing the light control method. In some embodiments, the light controller 110 includes a video information acquisition module, a color information calculation module, a control signal generation module and an output module. The video information acquisition module is configured for acquiring video data information from the video source device; the color information calculation module is configured for obtaining color data information of pixels in a preset region in a frame picture according to the video data information; the control signal generation module is configured for generating a corresponding light control signal according to the color data information; and the output module is configured for outputting the light control signal to the lamp bank to control an operating state of the lamp bank to match the video data information.

The lamp bank is in communication with the light controller 110. The lamp bank may be an LED lamp bank 121/122/123/124 or other multi-color lamp bank, such as an OLED lamp bank. The lamp bank may include a plurality of lamp beads. For example, when the lamp bank is the LED lamp bank 121/122/123/124, the lamp bank includes a plurality of smart integrated light sources (lamp beads) sequentially connected in series. The following various embodiments will only be described by taking the LED lamp bank 121/122/123/124 as an example.

In some embodiments, the lamp bank is positioned to be matched with a display picture of a display screen 220 of the video source device 200, so that a bright color state (operating state) of the lamp bank can match a valid display picture content of the display screen. For example, the lamp bank may be lamp strip 121/122/123/124, which is respectively arranged on a back (as shown in FIG. 3) or a side face of the display screen 220 of the video source device 200. For another example, the plurality of lamp banks are correspondingly arranged on four sides of the display screen facing a ceiling/floor/wall of a living room/cinema respectively. For another example, the lamp bank may be a vertical lamp bank, which is correspondingly arranged on two sides of the display screen respectively.

Figure 4:
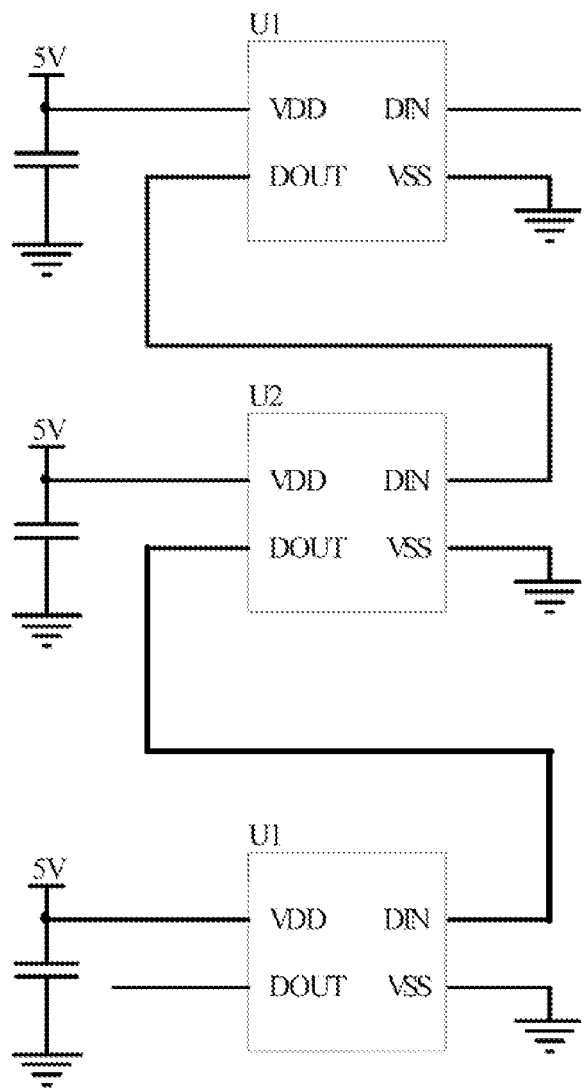
FIG. 4 is a schematic structural diagram of an internal circuit of a lamp bank according to an embodiment of the present application.

Referring to FIG. 4, in some embodiments, the LED lamp bank includes a plurality of smart integrated LED light sources (lamp beads) connected in sequence, and smart lamp bead chip of WS2812 series is employed in the smart integrated LED light sources (lamp beads). Control signals of the plurality of lamp beads are connected in series in sequence through data input ends DIN and data output ends DOUT of the WS2812 series smart lamp bead chips, and power supply signals of the plurality of lamp beads are connected in parallel (positive electrodes VDD of the smart lamp beads using WS2812 series chips are all connected with a cathode of the power supply, and negative electrodes VSS of the smart lamp beads using WS2812 series chips are all connected with a lamp strip ground). As shown in FIG. 4, the lamp bank includes a first smart light bead chip U1, a second smart light bead chip U2 and a third smart light bead chip U3, and a data input end DIN of the first smart light bead chip U1 is configured for receiving a data control signal of the light controller 110.

The system architectures and the application scenarios described in the embodiments of the present application are only for the purpose of more clearly explaining the technical solutions of the present application and do not constitute a limitation to the technical solutions according to the present application. Those of ordinary skill in the art may know that with the evolution of the system architectures and the emergence of new application scenarios, the technical solutions according to the embodiments of the present application are also applicable to similar technical problems.

Those having ordinary skill in the art can understand that the system architecture shown in FIG. 1 does not constitute a limitation to the embodiments of the present application, and may include more or less components than the illustrated components, or combine some components, or have different component arrangements.

In the system architecture shown in FIG. 1, the light controller may call a light control program stored thereon to execute the light control method.

On the basis of the above-mentioned system architecture, various embodiments of the light control method according to the embodiments of the present application are proposed.

Figure 5:
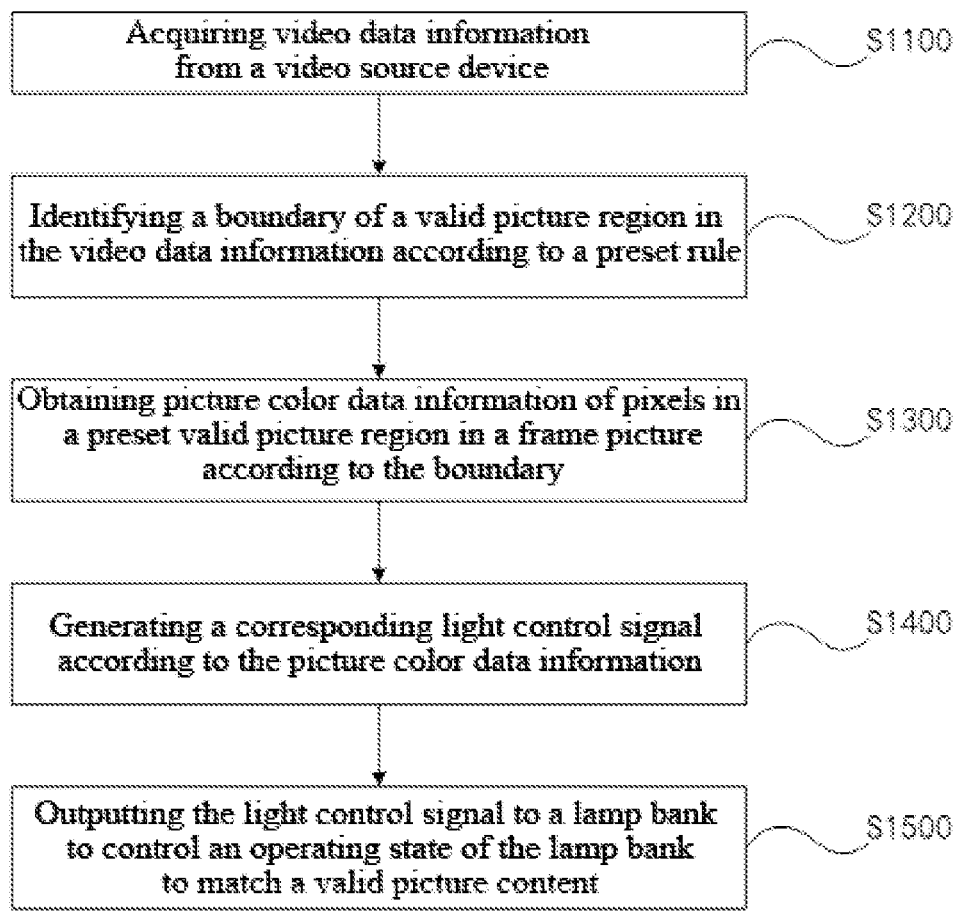
FIG. 5 is a flowchart of a light control method based on boundary identification according to an embodiment of the present application.

As shown in FIG. 5, an embodiment of the present application provides a light control method based on boundary identification applied to a light controller, wherein the light controller is in communication with a lamp bank, the lamp bank includes a plurality of lamp beads connected in sequence, and the method includes:

step S1100: acquiring video data information from a video source device;

step S1200: identifying a boundary of a valid picture region in the video data information according to a preset rule;

step S1300: obtaining picture color data information of pixels in a preset valid picture region in a frame picture according to the boundary;

step S1400: generating a corresponding light control signal according to the picture color data information; and step S1500: outputting the light control signal to the lamp bank to control an operating state of the lamp bank to match a valid picture content.

In some embodiments, in step S1100, the video data information from the video source device may be acquired by using a video interface, for example, the video data information may be HDMI video information or VGA video information, and the HDMI video information or VGA video information may be acquired by using an HDMI or VGA interface.

Figure 6:
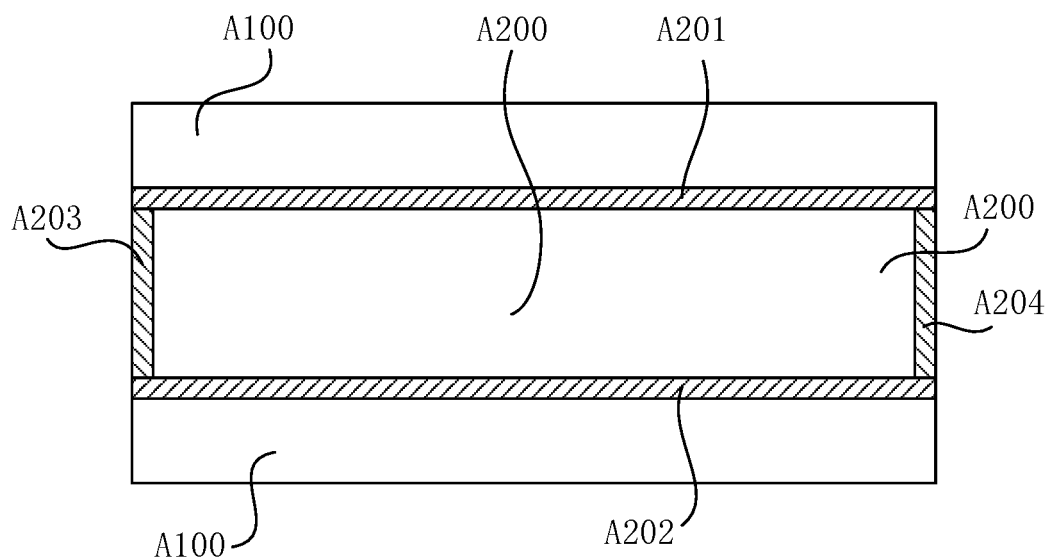
FIG. 6 is a schematic diagram of picture interface region division in a light control method based on boundary identification according to an embodiment of the present application.

Referring to FIG. 6, in some embodiments, in step S1200, an invalid edge picture region A100 may be identified by determining color data information of an edge region, and this method is applicable to the identification in case that the invalid edge picture region A100 is a black edge region. In some other embodiments, the invalid edge picture region A100 may also be identified by determining a changing state of the color data information of the edge region, and this method is applicable to the identification in case that the invalid edge picture region A100 is a solid color (not limited to black edge) region. This will not be limited in the present application.

In some embodiments, the color data information (including the color data information in the invalid edge picture region A100 and picture color data information in the valid picture region A200) may be RGB data information or YUV data information, which is not limited in the present application.

For example, the picture data output by a display card of the host 210 of the video source device may be read, so as to identify the invalid edge picture region A100 by executing step S1200 and step S1300, and read the picture color data information (such as RGB data information), and then generate a control signal to control a display state of the lamp bank according to a position correspondence between the lamp bank and the display screen 220. In some embodiments, the display state of each lamp bank changes synchronously with the picture, which can present a colorful display effect and give users an immersive experience, and can be used in various scenarios, such as e-sports, movie watching, and the like. This is especially suitable for film sources (video data information) with a high ratio of 21:9.

According to the embodiment of the present application, the invalid edge picture region A100 of the display picture is intelligently identified to accurately capture the valid display picture content, and the lamp bank is controlled according to the captured valid display picture content, so that the lamp bank can follow the change of the valid display picture content, thus playing a role of setting off the atmosphere and improving the viewing immersion.

The preset rule includes a scanning rule for scanning regions one by one from outside to center. Correspondingly, in step S1200, the identifying a boundary of a valid picture region in the video data information according to a preset rule includes:

step S1201-1: scanning the regions one by one from outside to center;

step S1201-2: if color data information of the currently scanned region is in conformity with a first preset condition, determining that the currently scanned region is an invalid edge picture region, and continuing to scan next region until none of the color data information of the currently scanned region is in conformity with the first preset condition; and step S1201-3: if the currently scanned row color data information or column color data information is not in conformity with the first preset condition, determining that the currently scanned region is the boundary of the valid picture region;

Alternatively, the preset rule includes a scanning rule for scanning the regions one by one from center to outside. Correspondingly, the identifying a boundary of a valid picture region in the video data information according to a preset rule includes:

step S1202-1: scanning the regions one by one from center to outside;

step S1202-2: if color data information of the currently scanned region is in conformity with a second preset condition, determining that the currently scanned region is a valid picture region, and continuing to scan next region until none of the color data information of the currently scanned region is in conformity with the second preset condition; and step S1202-3: if the color data information of the currently scanned region is not in conformity with the second preset condition, determining that the currently scanned region is the boundary of the valid picture region.

The first preset condition includes that all the color data information of the currently scanned region is less than first preset color information; and the second preset condition includes that: all the color data information of the currently scanned region is greater than second preset color information.

In some embodiments, since the valid picture region of the frame picture is generally located in a middle region of the frame picture, and the invalid edge picture region of the frame picture is generally located in an edge region of the frame picture, the preset rule may be the scanning rule of scanning the regions one by one from outside to center, or the scanning rule of scanning the regions one by one from center to outside. The scanning rule of scanning the regions one by one from outside to center refers to scanning from an upper edge, a lower edge, a left edge or a side edge of the frame picture to the center of the frame picture in turn. The scanning rule of scanning the regions one by one from center to outside refers to scanning from the center of the frame picture to the upper edge, the lower edge, the left edge or the side edge of the frame picture in turn. A determining strategy corresponding to the scanning rule of scanning the regions one by one from outside to center is that: if the color data information of the scanned region is less than a first preset threshold (first preset condition), the scanning is continued; and if the color data information of the scanned region is greater than the first preset threshold (first preset condition), the scanned region is considered as the boundary of the valid picture region, and the scanning is stopped. A determining strategy corresponding to the scanning rule of scanning the regions one by one from center to outside is that: if the color data information of the scanned region is greater than a second preset threshold (second preset condition), the scanning is continued; and if the color data information of the scanned region is less than the second preset threshold (second preset condition), the scanned region is considered as the boundary of the valid picture region, and the scanning is stopped. In the following, it is explained by taking the preset rule being the scanning rule of scanning the regions one by one from outside to center as an example. The principle of scanning rule of scanning the regions one by one from center to outside is similar to that of the scanning rule of scanning the regions one by one from outside to center, and will not be elaborated.

In some optional embodiments, the scanned region is a row or column, and the identifying a boundary A100 of a valid picture region in the video data information according to a preset rule in step S1200 includes:

step S1210: scanning pixels in a row or a column of the frame picture in the video data information according to the preset rule to obtain the row color data information or the column color data information; and the preset rule includes: scanning row by row from top to bottom, or scanning row by row from bottom to top, or scanning column by column from left to right or scanning column by column from right to left;

step S1220: if the currently scanned row color data information or column color data information is in conformity with a third preset condition, determining that the currently scanned row or column is the invalid edge picture region A100 (not the boundary of the valid picture region), and continuing to scan next row/column until none of the currently scanned row color data information or column color data information is in conformity with the third preset condition; and step S1230: if the currently scanned row color data information or column color data information is not in conformity with the third preset condition, determining that the currently scanned row or column is the boundary of the valid picture region.

The third preset condition includes that: all the row color data information is less than the first preset color information, or all the column color data information is less than the first preset color information.

In some embodiments, the invalid edge picture regions A100 on the upper side, the lower side, the left side and the right side can be correspondingly obtained by the preset rules of scanning row by row from top to bottom, scanning row by row from bottom to top, scanning column by column from left to right and scanning column by column from right to left, so that the middle valid picture region A200 can be obtained in the subsequent step S1300 according to the invalid edge picture regions A100 on the upper side, the lower side, the left side and the right side.

In some embodiments, the invalid edge picture region A100 can be identified by determining the color data information of the edge region. This manner is applicable to the identification in case that the invalid edge picture region A100 is a black edge region. For example, if the number of pixels (resolution) of the frame picture is 1920*1080, the color data information of a first block of 1920 pixels is firstly scanned according to the preset rule of scanning row by row from top to bottom. If the color data information of the first block of 1920 pixels is less than first preset color information (for example, 5), it is determined that all the color data information of the first block of 1920 pixels is black, and the first block is the invalid edge picture region A100, and next row is continuously scanned until the row color data information is not completely black, then it is determined that the currently scanned row is the valid picture region A200 on the upper side. The identification method of the invalid edge picture regions A100 on the lower side, the left side and the right side is similar to the above identification process, and will not be elaborated here.

It should be noted that when the preset rule includes the scanning rule of scanning the regions one by one from center to outside, the third preset condition includes that: all the row color data information is greater than the second preset color information, or all the column color data information is greater than the second preset color information. The scanning principle is similar to the scanning rule of scanning the regions one by one from outside to center, and will not be elaborated here.

In some embodiments, the preset rule includes a scanning rule for scanning row by row or column by column from outside to center; and the scanning pixels in a row or a column of the frame picture in the video data information according to the preset rule to obtain the row color data information or the column color data information includes:

selecting N pixels from M picture pixels in one row or one column, wherein N is less than or equal to M; and taking color data information of the N pixels as the row color data information or the column color data information.

In some embodiments, the invalid edge picture region may possibly have interference contents that affect identification of the boundary. For example, third-party logo and watermark or other contents that may interfere with scanning determination may appear in the invalid edge picture region. For this reason, in actual use, the third-party logo and watermark or other contents that may interfere with scanning determination are generally fixed at a certain position in the picture, for example, the third-party logo and watermark are generally fixed at a upper left corner or an upper right corner of the frame picture, therefore, the false identification of the boundary caused by the interference contents can be effectively avoided by only scanning the region in the middle for determination. For example, when scanning row by row from top to bottom, there are M picture pixels in one row, and N pixels are taken out of M picture pixels in each scanned row, wherein N is less than or equal to M, M is the number of picture pixels, N is the number of pixels to be taken, and N is less than or equal to M, wherein a starting point of the scanned row from left to right or right to left may be determined by a function, for example, determined by a function Min{ceil((M−N)/2), M−1}, and ceil is a function of rounding up to an integer.

In some optional embodiments, the preset rule includes: scanning block by block from top to bottom or scanning block by block from bottom to top with a first pixel distance as a block height and a second pixel distance as a step value; or, scanning block by block from left to right or scanning block by block from right to left with a third pixel distance as a block width and a fourth pixel distance as the step value. Correspondingly, in step S 1210 the scanning pixels in a row or a column of the frame picture in the video data information according to the preset rule to obtain the block color data information includes:

step S1211: dividing the currently scanned block into M sub-regions according to the preset rule, obtaining an average color value of pixels in each sub-region by calculating, and obtaining block color data information of the M sub-regions;

step S1212: if block color data information of the currently scanned block is in conformity with a fourth preset condition, determining that the currently scanned row or column is not a boundary of picture content region, and continuing to scan next block until none of the currently scanned block color data information is in conformity with the fourth preset condition; and step S1213: if the currently scanned block color data information is not in conformity with the fourth preset condition, determining that the currently scanned block is the boundary of the picture content region.

When the preset rule includes the scanning rule of scanning the regions one by one from outside to center, the fourth preset condition includes that: all the block color data information is less than the first preset color information; and when the preset rule includes the scanning rule of scanning the regions one by one from center to outside, the fourth preset condition includes that: all the block color data information is greater than the second preset color information.

In some embodiments, row-by-row identification with one pixel in a column is slow and inefficient. Moreover, due to the large deviation between individual pixels, it is easy to generate a determination error due to an individual abnormal pixel, thus leading to identification mistake. In order to avoid this problem, the present application adopts the preset rule of scanning block by block, and correspondingly takes the average color value of pixels of M sub-regions in the scanned block as the block color data information, so as to avoid the problem of identification error caused by possible deviation between individual pixels, and help to improve the identification efficiency at the same time.

The first pixel distance, the second pixel distance, the third pixel distance and the fourth pixel distance may be set according to requirements. For example, referring to FIG. 7, the first pixel distance and the third pixel distance may be 50 p, and the second pixel distance and the fourth pixel distance may be 5 p, that is to say, 50 p is used as the block height, and 5 p is used as the step value to scan block by block from top to bottom or scan block by block from bottom to top. Alternatively, 50 p is used as the block width, and 5 p is used as the step value to scan column by column from left to right or scan column by column from right to left. For example, if the number of pixels (resolution) of the frame picture is 1920*1080, the color data information of the first block of 1920*50 pixels is firstly scanned according to the preset rule of scanning block by block from top to bottom. If the color data information of the M sub-regions of the first block of 1920*50 pixels is less than the first preset color information (for example, 5), it is determined that all the color data information of the first block of 1920*50 pixels is black, and the first block is the invalid edge picture region, and a step value of 5 p is moved downwards to continuously scan next block until the block color data information is not completely black. The identification method of the invalid edge picture regions on the lower side, the left side and the right side is similar to the above identification process, and will not be elaborated here.

In some optional embodiments, the lamp bank includes N lamp bead units; and the number M of the sub-regions is matched with the number N of the lamp bead units.

In some embodiments, in order to generate light control signals corresponding to the N lamp bead units, the number M of the sub-regions used in the algorithm for identifying the invalid edge picture region may be matched with the number N of the lamp bead units. For example, M may be equal to N, or M may be proportional to N, so that the algorithm for identifying the invalid edge picture region is unified with the algorithm for extracting the picture color data information, thus being beneficial to the concise design of a light control algorithm.

Taking the identification of the invalid edge picture region on the upper side as an example, the blocks are scanned one by one, the number M of the sub-regions contained in each scanned block is equal to the number N of the upper edge lamp bead units, M=N=160, and the number of pixels (resolution) of the frame picture is 1920*1080. Each scanned block may be divided into 160 sub-regions, the pixel length of each sub-region is 12 P (1920/160), and the number of pixels of each upper edge sub-region is 600 P (12 P*50 P). An average color value of these 600 pixels is obtained by calculating to obtain color data information of the sub-region. In a similar fashion, the color data information of 160 sub-regions is obtained by calculating. If the color data information of the 160 sub-regions of the first block is less than the first preset color information (for example, 5), it is determined that all the color data information of the first block is black, and the first block is the invalid edge picture region, and a step value of 5 p is moved downwards to continuously scan next block until the block color data information is not completely black. The identification method of the invalid edge picture regions on the lower side, the left side and the right side is similar to the above identification process, and will not be elaborated here.

Figure 7:
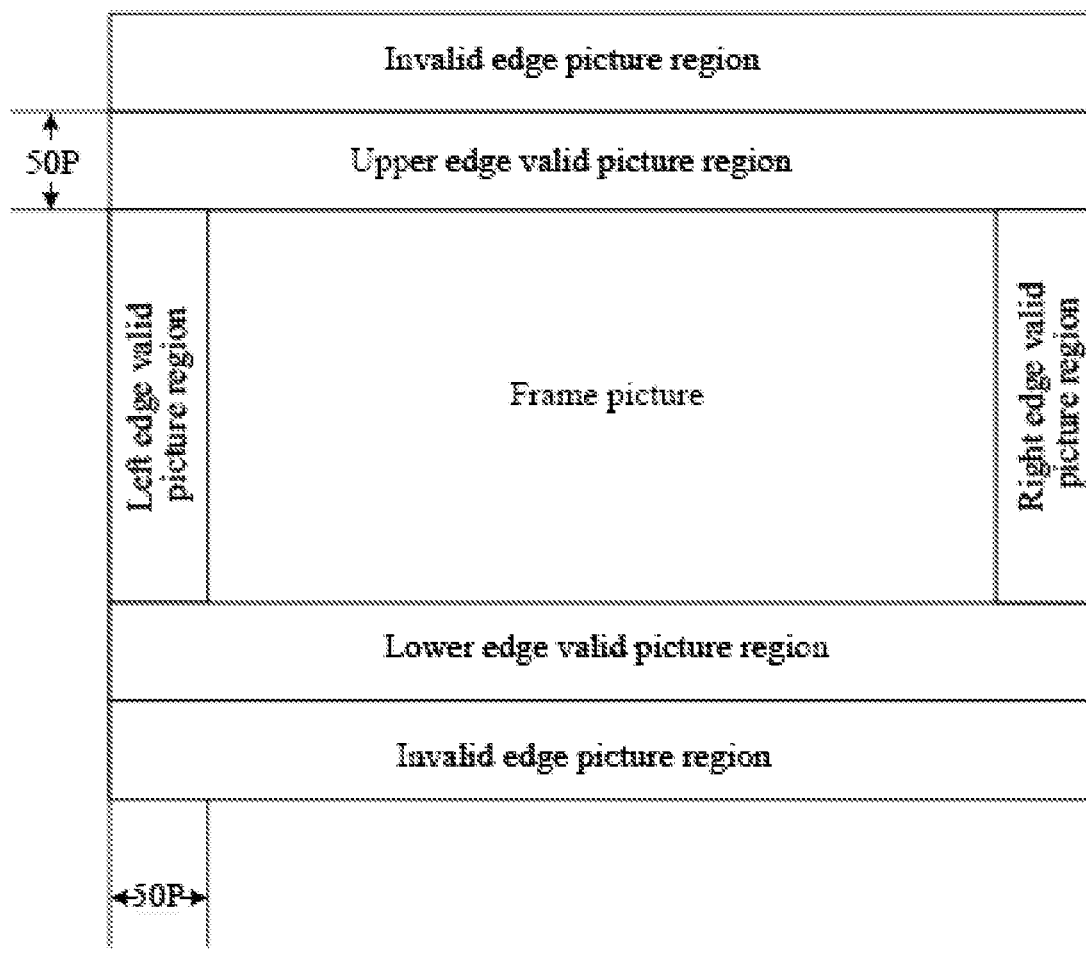
FIG. 7 is a schematic diagram of picture interface region division in a light control method based on boundary identification according to another embodiment of the present application.

In some optional embodiments, the preset valid picture region is the valid picture region with the boundary of the valid picture region shifted by a fifth pixel distance. For example, when the step value is 5 p, the fifth pixel distance may be 45 p, so as to realize that the valid picture region is a region of 50 p in width at the edge of the valid picture region (actual valid picture content). In some embodiments, as shown in FIG. 6 and FIG. 7, the preset valid picture region includes an upper edge valid picture region A201, a lower edge valid picture region A202, a left edge valid picture region A203 and a right edge valid picture region A204. The upper edge valid picture region A201 is a region with a width of 50 P at the upper edge of the valid picture region of the frame picture; the lower edge valid picture region A202 is a region with a width of 50 P in width at the lower edge of the valid picture region of the frame picture; the left edge valid picture region A203 is a region with a width of 50 P at the left edge of the valid picture region of the frame picture; and the right edge valid picture region A204 is a region with a width of 50 P at the right edge of the valid picture region of the frame picture.

Correspondingly, in step S1300, the obtaining picture color data information of pixels in a preset valid picture region in a frame picture according to the boundary includes:

step S1310: dividing the preset valid picture region into M sub-regions, obtaining an average color value of pixels in each sub-region by calculating, and obtaining picture color data information of the M sub-regions.

Correspondingly, in step S1400, the generating a corresponding light control signal according to the picture color data information includes:

step S1410: generating light control signals corresponding to the N lamp bead units according to the picture color data information of the M sub-regions.

After the invalid edge picture region is identified, by executing step S1300 and step S1400, the picture color data information of the pixels in the preset valid picture region (actual valid picture content) in the frame picture may be extracted, and the corresponding light control signal may be generated according to the picture color data information to realize the synchronization of light display and picture.

Figure 8:
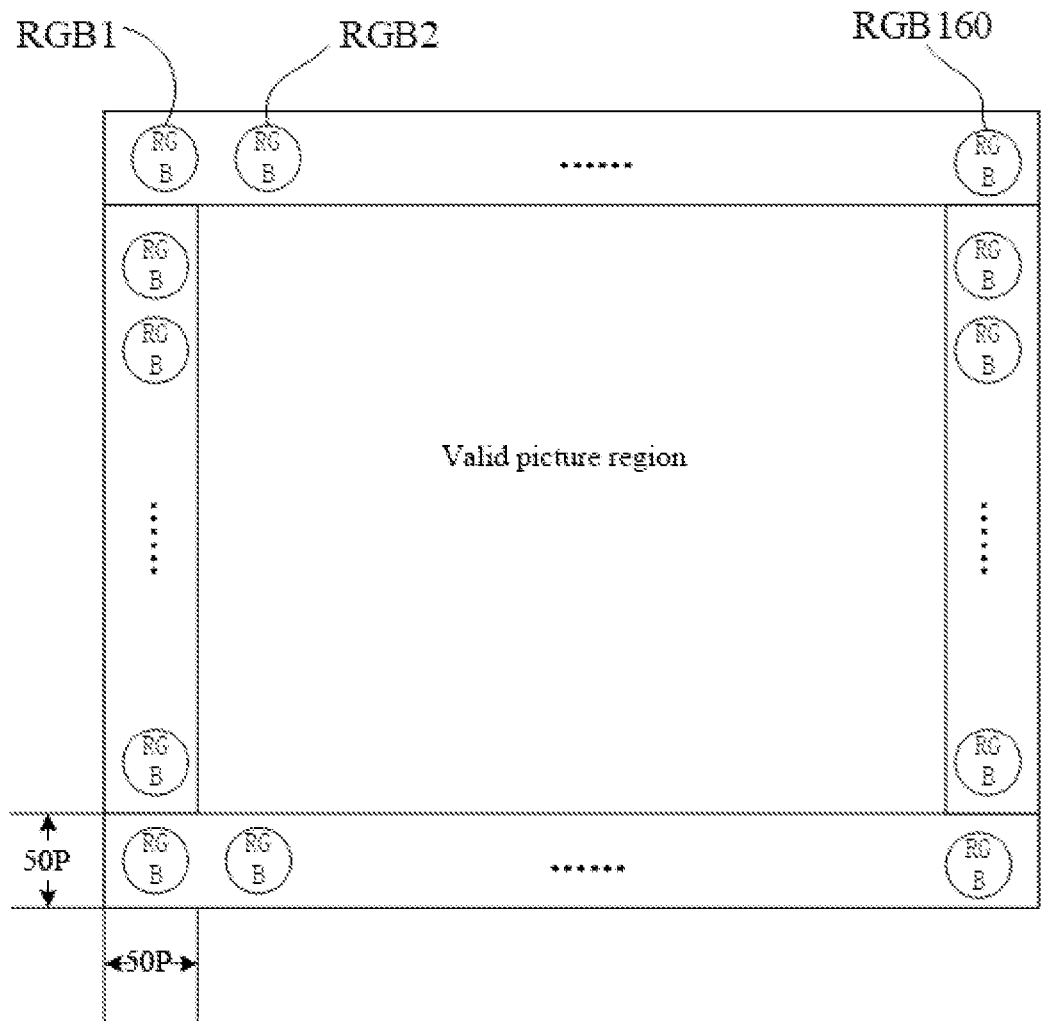
FIG. 8 is a schematic diagram of picture interface region division in a light control method based on boundary identification according to another embodiment of the present application.

In some embodiments, as shown in FIG. 8, taking the upper edge valid picture region as an example, the number M of the upper edge sub-regions contained in the upper edge valid picture region is equal to the number N of the upper edge lamp bead units, M=N=160, and a number of pixels (resolution) of the frame picture is 1920*1080. In step S1311, the upper edge valid picture region may be divided into 160 sub-regions, the pixel length of each sub-region is 12 P (1920/160), and the number of pixels of each upper edge sub-region is 600 P (12 P*50 P). An average color value of these 600 pixels is obtained by calculating to obtain a regional color value of the upper edge sub-region. In a similar fashion, the regional color values of 160 upper edge sub-regions which are RGB1, RGB2, . . . , RGB160, are respectively obtained by calculating, so as to correspondingly drive the display colors of 160 upper edge lamp bead units. The lower edge valid picture region is the same and will not be described in detail.

In some embodiments, taking the left edge valid picture region as an example, the number M of the left edge sub-regions is equal to the number N of the left edge lamp bead units, M=N=90, and the number of pixels (resolution) of the frame picture is 1920*1080. In step S1311, the left edge valid picture region may be divided into 90 sub-regions, the pixel length of each sub-region is 12 P (1080/90), and the number of pixels of each left edge sub-region is 600 P (12 P*50 P). An average color value of these 600 pixels is obtained by calculating to obtain a regional color value of the left edge sub-region. In a similar fashion, the regional color values of 90 left edge sub-regions are respectively obtained by calculating to correspondingly drive the display colors of 90 left edge lamp bead units. The right edge valid picture region is the same and will not be described in detail.

In some embodiments, the obtaining picture color data information of pixels in a preset valid picture region in a frame picture according to the boundary includes:

obtaining the current actual boundary by calculating according to the currently detected boundary and the actual boundary detected last time, so that the current actual boundary is located between the currently detected boundary and the actual boundary detected last time; and obtaining the picture color data information of the pixels in the preset picture content region in the frame picture according to the current actual boundary.

In some embodiments, for example, in the process of identifying the boundary of continuous frame pictures, if a distance between identified boundaries of two consecutive frames is large, it is easy to cause sudden change or jitter in the light, giving users a bad experience. Therefore, an embodiment of the present application designs a buffering algorithm, so that the current actual boundary is located between the currently detected boundary and the actual boundary detected last time, so as to reduce the sudden change or jitter of the light. For example, assuming that the actual boundary detected last time (a starting row number of a valid picture) is $n_0$ and the currently detected boundary (a starting row number of a valid picture) is $n_1$, the current actual boundary $n_1$ may be obtained by calculating via a calculation formula $n_1=n_0*a+n_1*(1.0-a)$, and let $n_0=n_1$ for calculation in next detection, wherein $a \in [0,1.0]$, the larger the value of a is, the better the anti-jitter effect of the picture is, and the slower the speed in which the upper and lower black edges of the picture follow to response.

In some other embodiments, the preset rule may also be other rules, for example, the invalid edge picture region may be identified by determining the changing state of the color data information of the edge region.

Specifically, the identifying a boundary of a valid picture region in the video data information according to a preset rule includes:

scanning a plurality of frame pictures in the video data information row by row/column by column; the frame pictures may be scanned from left to right or from right to left column by column, or scanned from top to bottom or from bottom to top row by row.

If a row/column in the frame pictures within a preset time or in a preset number of frame pictures keeps a preset color, the row/column is determined as the invalid edge picture region. When a row/column keeps a preset color (e.g., black) within a continuous period of time (e.g., 5 s) or in a series of frame pictures (e.g., 500 frames), the row/column is determined as the invalid edge picture region. In this way, the effect of black edge identification is realized.

The valid picture region is generated according to the determination result, so that the valid picture region is the actually played content picture with black edges removed.

The edge pixel information of the valid picture region may be extracted to correspondingly control the operating state of the lamp bank. This step refers to the above description and will not be elaborated here.

In some optional embodiments, the first preset condition further includes that: the scanned region does not reach a preset row maximum value or column maximum value. For example, the scanned row or the scanned column does not reach the preset row maximum value or column maximum value.

Moreover, in some embodiments, misjudgment may occur in the above-mentioned black edge processing algorithm, that is, the actual content picture is mistakenly determined as a black edge picture. In this case, misjudgment can be prevented by an algorithm of setting a preset proportional threshold.

In some embodiments, in step S1200, the identifying a boundary of a valid picture region in the video data information according to a preset rule further includes:

identifying the invalid edge picture region according to a preset content picture proportion.

In some embodiments, the row maximum value or column maximum value may be set according to the preset content picture proportion, for example, the preset content picture proportion may be set as 21:9. Since an aspect ratio of a general video picture will not be greater than 21:9, if the actual content picture proportion is greater than 21:9 due to the result of black edge identification, it can be considered as a misjudgment, and the row maximum value or column maximum value of the invalid edge picture region may be re-identified or directly set according to this proportion. When the row maximum value or column maximum value is reached, it is determined that the currently scanned row or column is the boundary of the valid picture region.

In some embodiments, the maximum value of the scanned region may also be set directly, for example, a height of the frame picture is HIGHT, an upper non-black edge detection height may be set as [0, HIGHT/2], and a lower non-black edge detection height may be set as [HIGHT/2, HIGHT].

In some embodiments, in step S1200, before the identifying the invalid edge picture region in the video data information, the method further includes:

step S1240: converting the video data information into UVC (USB Video Class) video data information; and step S1250: obtaining the color data information of the pixels in the preset region in the frame picture according to the UVC video data information.

In some embodiments, it is necessary to process a format of the video before identifying the invalid edge picture region in the video data information. For example, if the video data information is HDMI (High Definition Multimedia Interface) video information or VGA (Video Graphics Array) video information, the video data in the first format may be converted into the video data in the second format by performing steps S1240 to S1250 for subsequent processing. For example, the video data in the first format may be HDMI information, and the video data in the second format may be UVC video information. Using UVC can implement stronger scalability and compatibility, which is compatible with an external UVC device.

According to the embodiment of the present application, the invalid edge picture region of the display picture is intelligently identified to accurately capture the valid display picture content, and the lamp bank is controlled according to the captured valid display picture content, so that the lamp bank can follow the change of the valid display picture content, thus playing a role of setting off the atmosphere and improving the viewing immersion.

Moreover, the present application further provides a light control apparatus based on boundary identification applied to a light controller, wherein the light controller is in communication with a lamp bank, the lamp bank includes a plurality of lamp beads connected in sequence, and the apparatus includes:

a first module, configured for acquiring video data information from a video source device;

a second module, configured for identifying a boundary of a valid picture region in the video data information according to a preset rule;

a third module, configured for obtaining picture color data information of pixels in a preset valid picture region in a frame picture according to the boundary;

a fourth module, configured for generating a corresponding light control signal according to the picture color data information; and a fifth module, configured for outputting the light control signal to the lamp bank to control an operating state of the lamp bank to match a valid picture content.

It should be noted that the light control apparatus in this embodiment may be a light control apparatus applied to the system architecture of the embodiment shown in FIG. 1. In addition, the light control apparatus in this embodiment can perform the light control method based on boundary identification in the embodiment shown in FIG. 5. That is, the light control apparatus in this embodiment, the light control apparatus in the system architecture of the embodiment shown in FIG. 1, and the light control method based on boundary identification in the embodiment shown in FIG. 5 all belong to the same inventive concept, so these embodiments have the same implementation principles and technical effects, and will not be described in detail here.

The above-described apparatus embodiments are merely illustrative, wherein the units that are described as separate components may or may not be physically separated, i.e., may be located in one place or distributed across a plurality of network units. Part or all modules therein may be selected according to actual needs to realize the objective of the technical solution of the embodiment.

In addition, the present application further provides a light controller, including: a memory on which a computer program is stored; and a processor, configured for executing the computer program in the memory to implement the light control method based on boundary identification according to the first aspect.

The memory may be a built-in memory or an external memory. The processor may include a plurality of processing units. The processor and the memory may be connected by a bus or other means.

As a non-transient computer-readable storage medium, the memory may be used to store non-transient software programs and non-transient computer-executable programs. In addition, the memory may include a high-speed random access memory, and may also include a non-transitory memory, such as at least one disk memory device, a flash memory device, or other non-transitory solid storage devices. In some optional embodiments, the memory may optionally include memories remotely located with respect to the processor, and these remote memories may be connected with the processor via networks. Examples of the networks above include, but are not limited to, the Internet, intranet, local area networks, mobile communication networks, and combinations thereof.

It should be noted that, the light controller in this embodiment may be applied to the system architecture of the embodiment shown in FIG. 1, and the light controller in this embodiment and the light control apparatus in the system architecture of the embodiment shown in FIG. 1 have the same inventive concept, so these embodiments have the same implementation principles and technical effects, and will not be described in detail here.

Non-transient software programs and instructions required to implement the light control method based on boundary identification of the foregoing embodiments are stored in the memory, and when being executed by the processor, execute the light control method based on boundary identification in the foregoing embodiments, for example, executing the method steps S1100 to S1500 in FIG. 5 described above.

In addition, as shown in FIG. 1, the present application further provides a light module, including:

the light controller as mentioned above, wherein the light controller is in communication with a video source device; and a lamp bank, wherein the lamp bank is in communication with the light controller.

In some embodiments, the specific description of the light controller is provided as above, and will not be repeated again. The light controller may be in communication with the host of the video source device 200 through the video input interface, as shown in FIG. 1. It may be understood that the above-mentioned video source device 200 may be a computer, a PAD or other devices with a display, and is not limited in this embodiment.

It should be noted that the at least one lamp bank may be one set of lamp strips, or two sets of lamp strips, or four sets of lamp strips, and the like. For example, the at least one lamp bank may be one set of lamp strips circling around the edge region on the back of the display screen; may also be two sets of lamp strips, with each set of lamp strips respectively arranged along the edge region of one long side and one short side on the back of the display screen; and may also be four sets of lamp strips, and the like, which is not limited in the embodiment of the present application. In the following, only four sets of lamp strips are taken as an example for description.

For example, as shown in FIG. 2, at least one lamp bank includes four lamp strips, namely a lamp strip A 121, a lamp strip B 122, a lamp strip C 123 and a lamp strip D 124. The lamp strip A 121, the lamp strip B 122, the lamp strip C 123 and the lamp strip D 124 are all connected with the light controller 110, the light controller 110 is connected with the host 210 of the video source device 200, and the host 210 is connected with the display screen 220. As shown in FIG. 2, the lamp strip A 121, the lamp strip B 122, the lamp strip C 123 and the lamp strip D 124 are respectively arranged on the back of the display screen 220 near the edge of the display screen 220. The lamp strip A 121 is arranged along an upper edge of the display screen 220, the lamp strip B 122 is arranged along a lower edge of the display screen 220, the lamp strip C 123 is arranged along a left edge of the display screen 220, and the lamp strip D 124 is arranged along a right edge of the display screen 220. For another example, the four sets of lamp strips are correspondingly arranged on four sides of the display screen facing an indoor space respectively. For another example, the four sets of lamp banks are correspondingly arranged on four sides of the display screen facing a ceiling/floor/wall of a living room/cinema respectively. In a picture synchronization mode, the valid display picture content of the display screen can be matched with the bright color state of the corresponding lamp bank, thereby enhancing an immersion feeling of watching the display screen frame and avoiding visual fatigue, and further improving the viewing experience of users.

In some embodiments, referring to FIG. 1, FIG. 2 and FIG. 3, at least one lamp bank includes four sets of lamp strips, namely the lamp strip A 121, the lamp strip B 122, the lamp strip C 123 and the lamp strip D 124 respectively. The lamp strip includes a plurality of smart integrated light sources which are sequentially connected in series; and the four sets of lamp strips are correspondingly arranged on four sides of the back of the display screen 220 of the video source device 200 respectively. Two sets are long side lamp banks and two sets are short side lamp banks. In some other embodiments, at least one lamp bank includes two sets of lamp strips, namely a lamp strip E and a lamp strip F, and the lamp strip includes a plurality of smart integrated light sources sequentially connected in series. Two sets of lamp strips are correspondingly arranged on four sides of the back of the display screen 220 of the video source device 200, that is, the lamp strip E and the lamp strip F are both bent into an L-shape, and two sets of lamp strips are symmetrically arranged to form a rectangle, and are correspondingly arranged on four sides of the back of the display screen 220. A power supply 400 is used to supply power to the light module 100.

This embodiment provides a specific load controlled by the light controller 110, that is, the lamp bank. The lamp bank may include a plurality of lamp beads 130, wherein the plurality of lamp beads 130 may be distributed on different lamp banks according to the actual application requirements, for example, for the display screen 220 with a size of 14 inches and 21 inches, the lamp banks need to be distributed on the four sides of each display screen 220 to achieve the brightening effect. Therefore, both the display screens 220 with sizes of 14 inches and 21 inches need four lamp strips (or two lamp strips, as mentioned above). However, due to the differences in sizes, the lengths of the lamp banks required by the two display screens are different, for example, the display screen with the size of 14 inches requires four lamp strips with 30 lamp beads 130, while the display screen with the size of 21 inches requires may require four lamp strips with 50 lamp beads 130, but the length and the number of the lamp banks are selected or set according to the actual application scenarios and are not necessarily to be limited in some embodiments. The lamp strips on the ceiling, the wall and the floor, and the vertical lamp strip are the same, and will not be repeated here.

According to the embodiment of the present application, different application scenarios of the light module 100 can be realized, and the application range of the light controller 110 is correspondingly increased, thus improving the practicability of the light controller.

As shown in FIG. 1, in some embodiments, the lamp bank includes at least one lamp bank, which is respectively arranged on different positions of the display screen 220 of the video source device 200. The light controller 110 may acquire color data from the video source device in real time, and then transmit a corresponding color value which is RGB data, to the corresponding lamp bank according to the actual physical position of the lamp strip, thus the frame-color synchronization lamp bank of the display screen 220.

As shown in FIG. 2, in some embodiments, a chip of WS2812 series or WS2813 series is employed in the lamp beads 130 (smart integrated light source) in the lamp bank 100.

According to the embodiments of the present application, the lamp beads using WS2812 series chip are selected, which can make the control of the lamp bank by the light controller simpler and more efficient, and improve the detection efficiency and reliability.

According to the embodiments of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

Moreover, the present application further provides a computer-readable storage medium storing a computer-executable instruction, wherein the program instruction, when executed by a processor, implements the light control method based on boundary identification mentioned above. For example, when being executed by one processor in the light controller embodiments mentioned above, the above-mentioned processor is enabled to execute the light control method based on boundary identification in the foregoing embodiments, for example, execute the method steps S1100 to S1500 in FIG. 5 described above.

Those of ordinary skills in the art will appreciate that all or some of the steps and systems in the methods disclosed above may be implemented as software, firmware, hardware, and suitable combinations thereof. Some physical components or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may include a computer storage medium (or non-transitory medium) and a communication medium (or transitory medium). As well known to those of ordinary skills in the art, the term computer storage medium includes volatile and non-volatile, removable and non-removable media implemented in any method or art for storing information (such as computer-readable instruction, data structure, programming module or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and may include any information delivery medium.

The foregoing describes the preferred embodiments of the present application in detail, but the embodiments of the present application are not limited to the foregoing embodiments. Those having ordinary skill in the art can make various equal deformations or replacements without departing from the spirit of the embodiments of the present application, and these equal deformations or replacements shall all fall within the scope limited by the claims of the embodiments of the present application.

The invention claimed is:

1. A light control method based on boundary identification, applied to a light controller, wherein the light controller is in communication with a lamp bank, the lamp bank comprises a plurality of lamp beads connected in sequence, and the method comprises:

acquiring video data information from a video source device;

identifying a boundary of a valid picture region in the video data information according to a preset rule;

obtaining picture color data information of pixels in a preset valid picture region in a frame picture according to the boundary;

generating a corresponding light control signal according to the picture color data information; and outputting the light control signal to the lamp bank to control an operating state of the lamp bank to match a valid picture content;

wherein:

the preset rule comprises a scanning rule for scanning regions one by one from outside to center; and identifying the boundary of the valid picture region in the video data information according to the preset rule comprises:

scanning the regions one by one from outside to center;

if first color data information of a first currently scanned region is in conformity with a first preset condition, determining that the first currently scanned region is an invalid edge picture region, and continuing to scan next region until none of the first color data information of the first currently scanned region is in conformity with the first preset condition; and if currently scanned row color data information or column color data information is not in conformity with the first preset condition, determining that the first currently scanned region is the boundary of the valid picture region;

or, the preset rule comprises a scanning rule for scanning regions one by one from center to outside; and identifying the boundary of the valid picture region in the video data information according to the preset rule comprises:

scanning the regions one by one from center to outside;

if second color data information of a second currently scanned region is in conformity with a second preset condition, determining that the second currently scanned region is a valid picture region, and continuing to scan next region until none of the second color data information of the second currently scanned region is in conformity with the second preset condition; and if the second color data information of the second currently scanned region is not in conformity with the second preset condition, determining that the second currently scanned region is the boundary of the valid picture region;

wherein, the first preset condition comprises that all the first color data information of the first currently scanned region is less than first preset color information; and the second preset condition comprises that all the second color data information of the second currently scanned region is greater than second preset color information.

2. The light control method based on the boundary identification of claim 1, wherein the scanned region is a row or a column, and identifying the boundary of the valid picture region in the video data information according to the preset rule comprises:

scanning pixels in a row or a column of the frame picture in the video data information according to the preset rule to obtain the row color data information or the column color data information; and the preset rule further comprises: scanning row by row from top to bottom, or scanning row by row from bottom to top, or scanning column by column from left to right or scanning column by column from right to left;

if the currently scanned row color data information or column color data information is in conformity with a third preset condition, determining that the currently scanned row or column is not the boundary of the valid picture region, and continuing to scan next row/column until none of the currently scanned row color data information or column color data information is in conformity with the third preset condition; and if the currently scanned row color data information or column color data information is not in conformity with the first preset condition, determining that the currently scanned row or column is the boundary of the valid picture region;

wherein, when the preset rule comprises the scanning rule of scanning regions one by one from outside to center, the third preset condition comprises that: all the row color data information is less than the first preset color information, or all the column color data information is less than the first preset color information; and wherein, when the preset rule comprises the scanning rule of scanning regions one by one from center to outside, the third preset condition comprises that: all the row color data information is greater than the second preset color information, or all the column color data information is greater than the second preset color information.

3. The light control method based on the boundary identification of claim 2, wherein:

the preset rule comprises a scanning rule for scanning row by row or column by column from outside to center; and the scanning pixels in a row or a column of the frame picture in the video data information according to the preset rule to obtain the row color data information or the column color data information comprises:

selecting N pixels from M picture pixels in one row or one column, wherein N is less than or equal to M; and taking color data information of the N pixels as the row color data information or the column color data information.

4. The light control method based on the boundary identification of claim 1, wherein the preset rule comprises: scanning block by block from top to bottom or scanning block by block from bottom to top with a first pixel distance as a block height and a second pixel distance as a step value; or, scanning block by block from left to right or scanning block by block from right to left with a third pixel distance as a block width and a fourth pixel distance as a step value; and the identifying the boundary of the valid picture region in the video data information according to the preset rule comprises:

dividing a currently scanned block into M first sub-regions according to the preset rule, obtaining a first average color value of pixels in each first sub-region by calculating, and obtaining block color data information of the M first sub-regions;

if the block color data information of the currently scanned block is in conformity with a fourth preset condition, determining that the currently scanned row or column is not the boundary of the valid picture region, and continuing to scan next block until none of the currently scanned block color data information is in conformity with the fourth preset condition; and if the block color data information of the currently scanned block is not in conformity with the fourth preset condition, determining that the currently scanned block is the boundary of the valid picture region;

wherein, when the preset rule comprises the scanning rule of scanning regions one by one from outside to center, the fourth preset condition comprises that: all the block color data information is less than the first preset color information; and when the preset rule comprises the scanning rule of scanning regions one by one from center to outside, the fourth preset condition comprises that: all the block color data information is greater than the second preset color information.

5. The light control method based on the boundary identification of claim 4, wherein the lamp bank comprises N lamp bead units; and the number M of the first sub-regions is matched with the number N of the lamp bead units.

6. The light control method based on the boundary identification of claim 5, wherein the preset valid picture region is the valid picture region with the boundary of the valid picture region shifted by a fifth pixel distance; and obtaining the picture color data information of pixels in the preset valid picture region in the frame picture according to the boundary comprises:

dividing the preset valid picture region into M second sub-regions, obtaining a second average color value of pixels in each second sub-region by calculating, and obtaining the picture color data information of the M second sub-regions; and generating the corresponding light control signal according to the picture color data information comprises:

generating light control signals corresponding to the N lamp bead units according to the picture color data information of the M second sub-regions.

7. The light control method based on the boundary identification of claim 1, wherein obtaining the picture color data information of pixels in the preset valid picture region in the frame picture according to the boundary comprises:

obtaining a current actual boundary by calculating according to a currently detected boundary and an actual boundary detected last time, so that the current actual boundary is located between the currently detected boundary and the actual boundary detected last time; and obtaining the picture color data information of the pixels in the preset valid picture region in the frame picture according to the current actual boundary.

8. The light control method based on the boundary identification of claim 1, wherein the first preset condition further comprises that: the scanned region does not reach a preset maximum value.

9. A non-transitory computer-readable storage medium storing a computer-executable instruction, wherein the program instruction, when executed by a processor, causes the processor to perform a light control method based on boundary identification comprising:

acquiring video data information from a video source device;

identifying a boundary of a valid picture region in the video data information according to a preset rule;

obtaining picture color data information of pixels in a preset valid picture region in a frame picture according to the boundary;

generating a corresponding light control signal according to the picture color data information; and outputting the light control signal to a lamp bank to control an operating state of the lamp bank to match a valid picture content;

wherein:

the preset rule comprises a scanning rule for scanning regions one by one from outside to center; and identifying the boundary of the valid picture region in the video data information according to the preset rule comprises:

scanning the regions one by one from outside to center;

if first color data information of a first currently scanned region is in conformity with a first preset condition, determining that the first currently scanned region is an invalid edge picture region, and continuing to scan next region until none of the first color data information of the first currently scanned region is in conformity with the first preset condition; and if currently scanned row color data information or column color data information is not in conformity with the first preset condition, determining that the first currently scanned region is the boundary of the valid picture region;

or, the preset rule comprises a scanning rule for scanning regions one by one from center to outside; and identifying the boundary of the valid picture region in the video data information according to the preset rule comprises:

scanning the regions one by one from center to outside;

if second color data information of a second currently scanned region is in conformity with a second preset condition, determining that the second currently scanned region is a valid picture region, and continuing to scan next region until none of the second color data information of the second currently scanned region is in conformity with the second preset condition; and if the second color data information of the second currently scanned region is not in conformity with the second preset condition, determining that the second currently scanned region is the boundary of the valid picture region;

wherein, the first preset condition comprises that all the first color data information of the first currently scanned region is less than first preset color information; and the second preset condition comprises that all the second color data information of the second currently scanned region is greater than second preset color information.

* * * * *